US008229122B2

(12) United States Patent
Chang et al.

(10) Patent No.: US 8,229,122 B2
(45) Date of Patent: Jul. 24, 2012

(54) SHARED KEY TRANSMISSION APPARATUS, AUTOMATIC TELLER MACHINE, AUTOMATIC TELLER SYSTEM AND METHOD OF CONTROLLING THE AUTOMATIC TELLER MACHINE

(75) Inventors: Boick Chang, Seoul (KR); Seungtaek Lim, Seoul (KR); Sungsuk Hong, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 593 days.

(21) Appl. No.: 12/411,687

(22) Filed: Mar. 26, 2009

(65) Prior Publication Data
US 2010/0135499 A1 Jun. 3, 2010

(30) Foreign Application Priority Data

Dec. 3, 2008 (KR) .................. 10-2008-0121761

(51) Int. Cl.
*H04L 29/06* (2006.01)
(52) U.S. Cl. .................. 380/278; 380/268; 380/282
(58) Field of Classification Search .................. None
See application file for complete search history.

(56) References Cited

U.S. PATENT DOCUMENTS

| | | | | |
|---|---|---|---|---|
| 6,072,876 | A * | 6/2000 | Obata et al. | 380/286 |
| 7,159,114 | B1 * | 1/2007 | Zajkowski et al. | 713/171 |
| 7,392,384 | B2 * | 6/2008 | Hopkins et al. | 713/168 |
| 2004/0165726 | A1 * | 8/2004 | Yamamichi et al. | 380/277 |

OTHER PUBLICATIONS

Sagem Denmark, "Remote Key Loading," Jun. 2007, Accessed Sep. 23, 2011, Retrieved from http://www.cryptera.com/doc/REMOTE-KEY-LOAD.pdf.*

Diebold, "Remote Key Transport White Paper," Nov. 9, 2006, Retrieved http://web.archive.org/web/20061109220350/http://www.trustedsecurity.com/docs/diebold_white_paper_rkt.pdf.*
Ingenico, "Remote Key Load Simplifies Secure Key Management," Press Release—Nov. 18, 2008, Accessed Sep. 23, 2011, Retrieved from http://www.ingenico.com/es/media_center/press_releases/remote-key-load-simplifies-secure-key-management_g4cxej6s.html.*
Menezes, A. et al., "Chapter 10: Identification and Entity Authentication," Handbook of Applied Cryptography, 1996, pp. 385-424, CRC Press, Inc.
Menezes, A. et al., "Chapter 12: Key Establishment Protocols," Handbook of Applied Cryptography, 1996, pp. 489-541, CRC Press, Inc.
Menezes, A. et al., "Chapter 13: Key Management Techniques," Handbook of Applied Cryptography, 1996, pp. 543-590, CRC Press, Inc.

* cited by examiner

*Primary Examiner* — Jung Kim
*Assistant Examiner* — Robert Leung
(74) *Attorney, Agent, or Firm* — Fenwick & West LLP

(57) ABSTRACT

Provided are a shared key transmission apparatus, an automatic teller machine (ATM), and a controlling method thereof. The shared key transmission apparatus may include: a reception unit receiving, from the ATM, a first cryptogram where a random number is encrypted; a decryption unit restoring the random number from the first cryptogram; an encryption unit encrypting the shared key using the restored random number; and a transmission unit transmitting the encrypted shared key to the ATM. The ATM may include: an encryption unit generating a random number and encrypting the random number to generate a first cryptogram; a transmission unit transmitting the first cryptogram to the shared key transmission apparatus; a reception unit receiving, from the shared key transmission apparatus, a shared key that is encrypted using the restored random number; and a decryption unit restoring the shared key from the encrypted shared key using the generated random number.

15 Claims, 7 Drawing Sheets

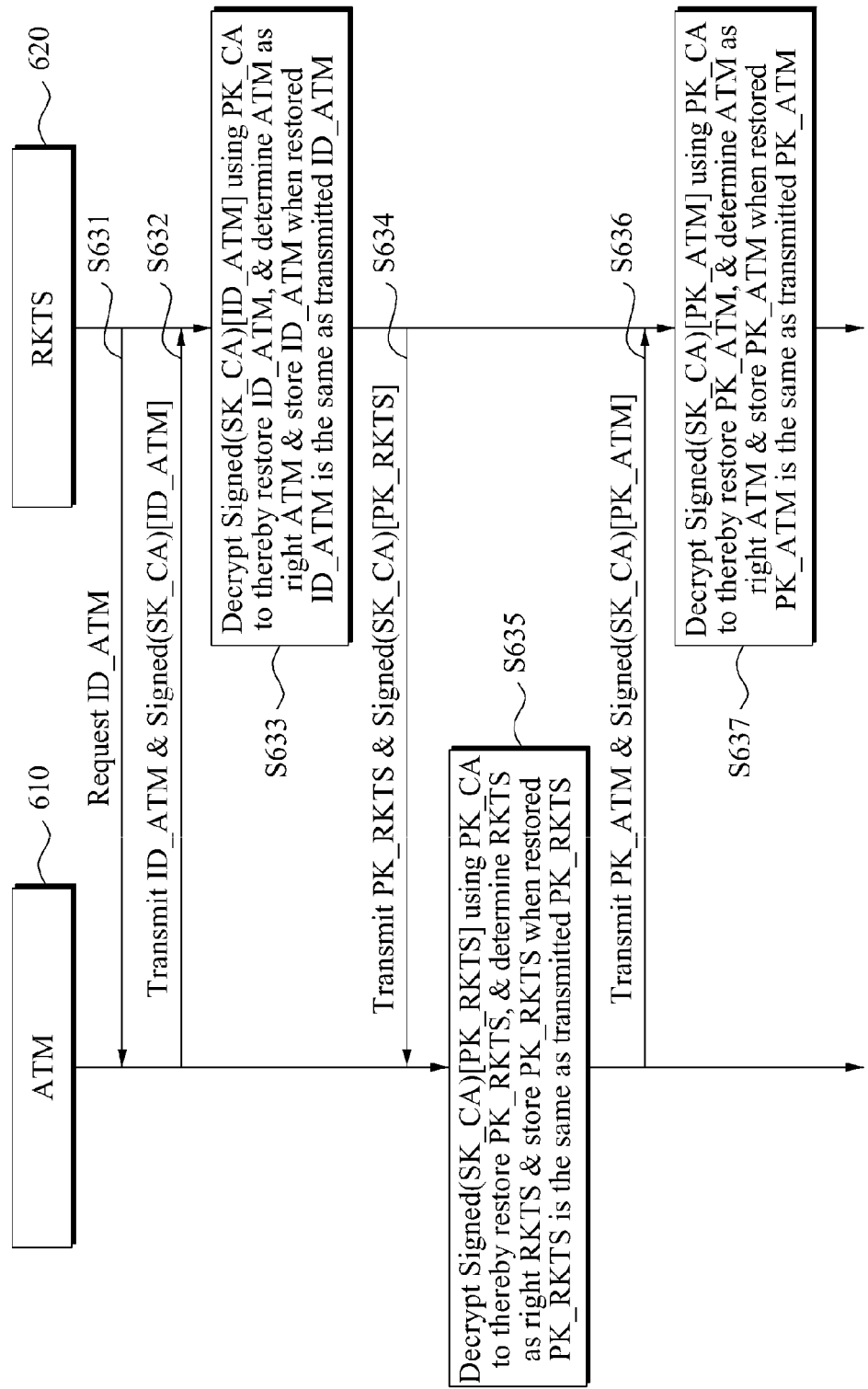

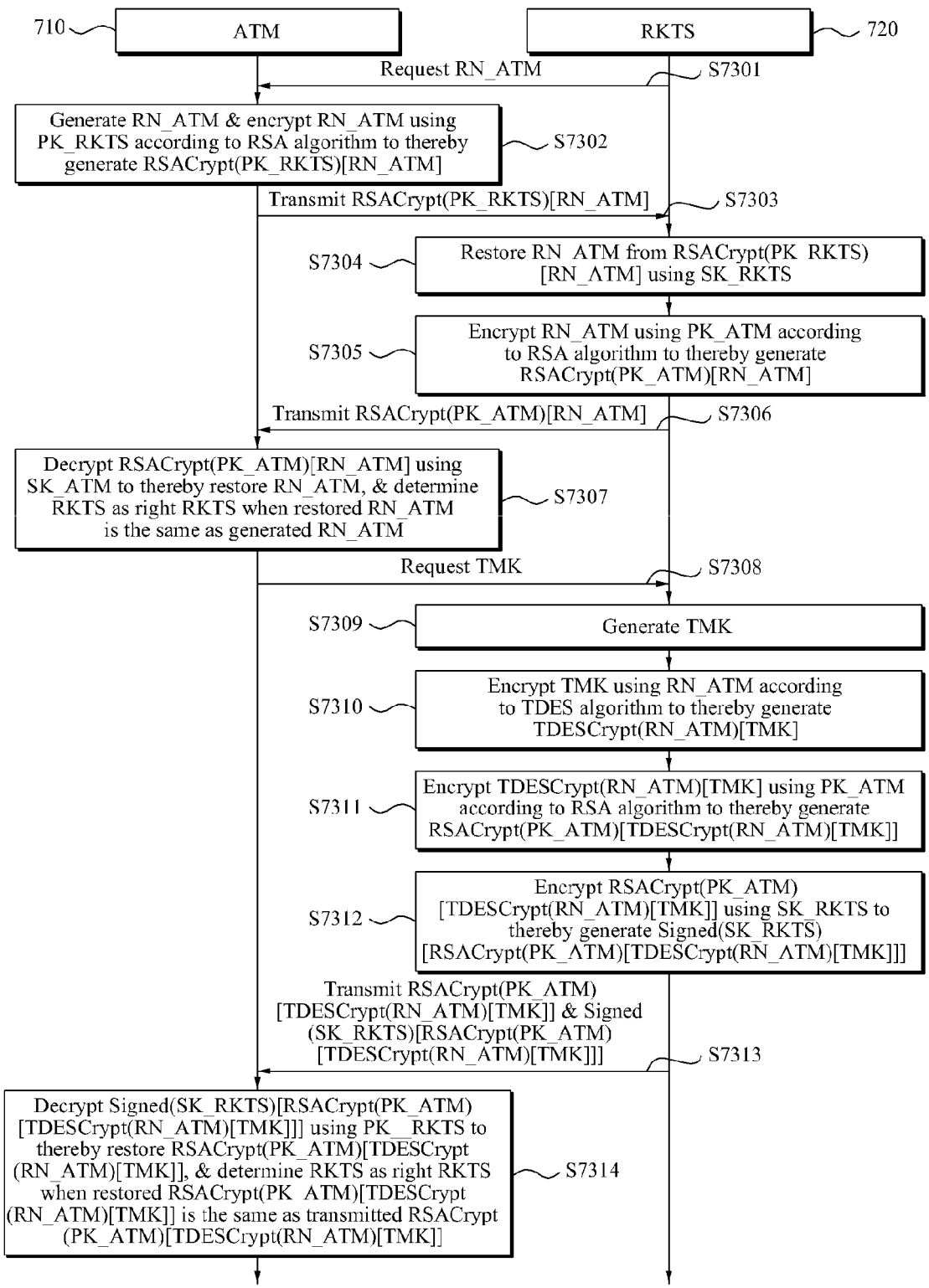

SHARED KEY TRANSMISSION APPARATUS, AUTOMATIC TELLER MACHINE, AUTOMATIC TELLER SYSTEM AND METHOD OF CONTROLLING THE AUTOMATIC TELLER MACHINE

CROSS-REFERENCE TO RELATED APPLICATION

This application claims the benefit of Republic of Korea Patent Application No. 10-2008-0121761, filed on Dec. 3, 2008, in the Korean Intellectual Property Office, the disclosure of which is incorporated herein by reference.

BACKGROUND

1. Field of the Invention

The present invention relates to a shared key transmission apparatus, an automatic teller machine (ATM), and a method of controlling the shared key transmission apparatus and the ATM. More particularly, the present invention relates to a shared key transmission apparatus that may install online a shared key required to maintain a security of a data communication between an ATM and a host, an ATM, and a method of controlling the shared key transmission apparatus and the ATM.

2. Description of the Related Art

An automatic teller machine (ATM) has brought an innovative development to traditional financial transactions that had been performed through a direct contact between a customer and a teller in a financial institution. Due to the ATM, a waiting time of users has been significantly reduced. Even after business hours of the financial institution is over, if a user desires to, the user may use financial services at any time. Also, in view of the financial institution, it takes less to process financial services and it is possible to enhance a work efficiency through a reduction in a manpower and a cost.

The ATM is basically providing many financial operations that are being performed at the financial institution, for example, a bank, a village fund, and the like. When the user performs a financial transaction such as an account transfer, a balance inquiry, a withdrawal, and the like, the user may quickly perform the user's desired financial transaction by simply manipulating the ATM installed in a bank, without a help of a teller. Due to the above advantages of ATMs, a number of users using the ATMs, a number of installed ATMs, places where the ATMs are installed, and the like increase. Currently, many users can easily find the ATMs at any place.

In order to maintain a security of a data communication between a ATM and a host, a shared key such as a Terminal Master Key (TMK) may need to be installed in the ATM and the host.

In the conventional art, a reliable manager may need to visit an ATM and directly input and store a shared key in the ATM. Generally, due to the security, two managers input, into the ATM, two partial shared keys envelope1 and envelope2 that constitute the ATM. They may combine the input two partial shared keys envelope1 and envelope2 to thereby generate the shared key. Specifically, an operation of installing the shared key in the ATM may be performed offline.

However, in the above conventional installation method, two manager need to visit every ATM and directly install the shared key in it. Accordingly, installation of the shared key is inconvenient and an unnecessary manpower is used. Also, the shared key may be leaked by the managers.

SUMMARY

An aspect of the present invention is to reduce an unnecessary operation and a manpower consumption that may be required to install a shared key in an automatic teller machine (ATM).

Another aspect of the present invention is to enhance a security when installing online a shared key in an ATM.

According to an aspect of the present invention, there is provided a shared key transmission apparatus to transmit, to an ATM, a shared key that is used for a data communication between the ATM and a host, the apparatus including: a reception unit to receive, from the ATM, a first cryptogram where a random number is encrypted; a decryption unit to restore the random number from the first cryptogram; an encryption unit to encrypt the shared key using the restored random number; and a transmission unit to transmit the encrypted shared key to the ATM.

In this instance, the shared key transmission apparatus may further include a shared key generation unit to generate the shared key. The shared key generation unit may generate the shared key by combining at least one partial shared key that is received from a shared key management system.

According to another aspect of the present invention, there is provided an ATM to perform a data communication with a host, to receive, online from a shared key transmission apparatus, a shared key used for the data communication, and to install the received shared key, the ATM including: an encryption unit to generate a random number and to encrypt the random number to thereby generate a first cryptogram; a transmission unit to transmit the first cryptogram to the shared key transmission apparatus; a reception unit to receive, from the shared key transmission apparatus, a shared key that is encrypted using the random number restored from the first cryptogram; and a decryption unit to restore the shared key from the encrypted shared key using the generated random number.

According to yet another aspect of the present invention, there is provided a method of controlling an ATM to perform a data communication with a host, to receive, online from a shared key transmission apparatus, a shared key used for the data communication, and to install the received shared key, the method including: generating a random number and encrypting the random number to generate a first cryptogram; transmitting the first cryptogram to the shared key transmission apparatus; receiving, from the shared key transmission apparatus, a shared key that is encrypted using the random number restored from the first cryptogram; and restoring the shared key from the encrypted shared key using the generated random number.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings.

FIG. 6 is a flowchart illustrating a public key exchange process, that is, a mutual authentication process between an ATM and a RKTS according to an embodiment of the present invention.

FIG. 7 is a flowchart illustrating a process of transmitting a shared key according to an embodiment of the present invention.

DETAILED DESCRIPTION

Figure 1:
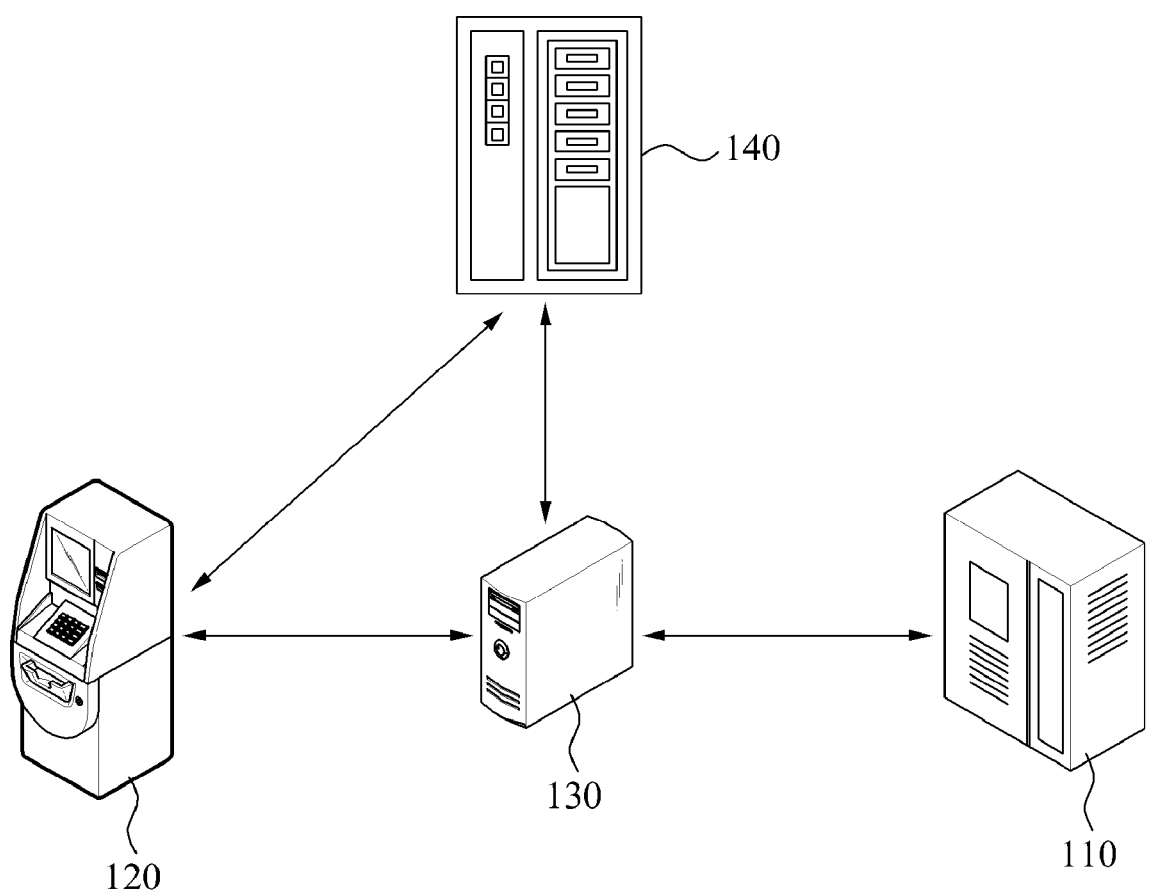
FIG. 1 illustrates a connection relationship among a host, an automatic teller machine (ATM), a shared key transmission apparatus, and a certificate authority according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a connection relationship among a host 110, an automatic teller machine (ATM) 120, a shared key transmission apparatus 130, and a certificate authority 140 according to an embodiment of the present invention.

The ATM 120 may be connected to the host 110 via a communication network to perform a data communication with the host 110.

To maintain a security of the data communication between the host 110 and the ATM 120, the shared key transmission apparatus 130 may transmit a shared key to each of the host 110 and the ATM 120.

For example, the shared key transmission apparatus 130 may transmit a Terminal Master Key (TMK) to the host 110 and the ATM 120.

Although only a single host and a single ATM are shown in FIG. 1, the shared key transmission apparatus 130 may be connected to a plurality of hosts and a plurality of ATMs.

To install the shared key in the ATM online, a data communication may be performed between the ATM 120 and the shared key transmission apparatus 130. To enhance a security of the data communication, the ATM 120 and the shared key transmission apparatus 130 may encrypt data, and transmit and receive the encrypted data. A channel used for the data communication between the ATM 120 and the shared key transmission apparatus 130 may be independent from a channel used for the data communication between the host 110 and the ATM 120. Specifically, transmission of the shared key may be performed independently from the channel used for the data communication between the host 110 and the ATM 120.

As a preliminary operation to the data communication between the ATM 120 and the shared key transmission apparatus 130, a public key, a secret key, and an identification number (ID) of the ATM 120 that are generated at the certificate authority 140 may be installed in the ATM 120. The public key, the secret key, and the ID may be installed in a manufacturing operation of the ATM 120. Hereinafter, the public key, the secret key, and the ID of the ATM 120 will be referred to as PK_ATM, SK_ATM, and ID_ATM, respectively.

Also, a public key and a secret key of the shared key transmission apparatus 130 that are generated at the certificate authority 140 may be installed in the shared key transmission apparatus 130. Hereinafter, the public key and the secret key of the shared key transmission apparatus 130 will be referred to as PK_RKTS and SK_RKTS, respectively. A remote key transfer server may correspond to the shared key transmission apparatus 130.

PK_ATM and ID_ATM stored at the ATM 120, and PK_RKTS stored at the shared key transmission apparatus 130 may receive a digital signature at the certificate authority 140. The digital signature indicates encrypting a key to receive the digital signal using a secret key of the certificate authority 140. Hereinafter, the secret key of the certificate authority 140 will be referred to as SK_CA. Also, the signed PK-ATM, ID_ATM, and PK_RKTS will be referred to as Signed(SK_CA)[PK_ATM], Signed(SK_CA)[ID_ATM], and Signed(SK_CA)[PK_RKTS], respectively.

The above signed keys may be installed in the ATM 120 and the shared key transmission apparatus 130. In this instance, the signed keys may be installed before the data communication between the ATM 120 and the shared key transmission apparatus 130 is performed. Accordingly, the ATM 120 may store PK_ATM, SK_ATM, ID_ATM, Signed (SK_CA)[PK_ATM], and Signed(SK_CA)[ID_ATM]. The shared key transmission apparatus 130 may store PK_RKTS, SK_RKTS, and Signed(SK_CA)[PK_RKTS].

To transmit the shared key between the ATM 120 and the shared key transmission apparatus 130, a mutual authentication and a public key exchange may be performed between the ATM 120 and the shared key transmission apparatus 130 in addition to the above preliminary operation. When the mutual authentication and the public key exchange is completed, the ATM 120 may further store PK_RKTS in addition to PK_ATM, SK_ATM, ID_ATM, Signed(SK_CA)[PK_ATM], and Signed(SK_CA)[ID_ATM]. The shared key transmission apparatus 130 may further store PK_ATM in addition to PK_RKTS, SK_RKTS, and Signed(SK_CA)[PK_RKTS]. The mutual authentication and the public key exchange will be further described later with reference to FIG. 6.

The ATM 120 and the shared key transmission apparatus 130 may safely transmit and receive the shared key using the above keys, for example, PK_ATM, SK_ATM, ID_ATM, PK_RKTS, and SK_RKTS, and the above signed keys, for example, Signed(SK_CA)[PK_ATM], Signed(SK_CA)[ID_ATM], and Signed(SK_CA)[PK_RKTS].

Figure 2:
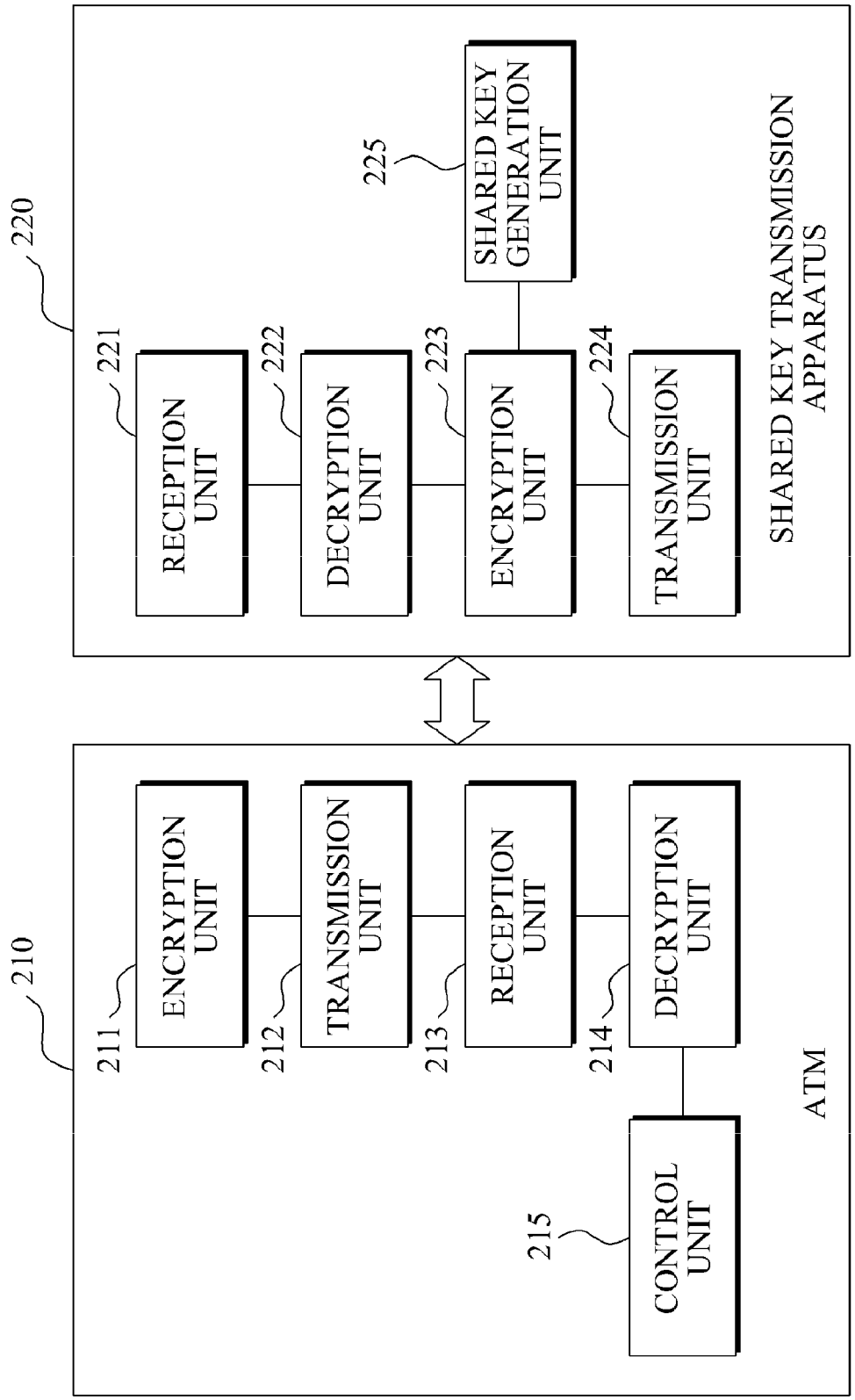
FIG. 2 is a block diagram illustrating a configuration of an automated teller system including an ATM and a shared key transmission apparatus according to an embodiment of the present invention.

FIG. 2 is a block diagram illustrating a configuration of an automated teller system including an ATM 210 and a shared key transmission apparatus 220 according to an embodiment of the present invention.

The ATM 210 may include an encryption unit 211, a transmission unit 212, a reception unit 213, a decryption unit 214, and a control unit 215. The shared key transmission apparatus 220 may include a reception unit 221, a decryption unit 222, an encryption unit 223, a transmission unit 224, and a shared key generation unit 225. Hereinafter, a function of each of constituent elements will be described.

As described above, transmission/reception of data may be performed independently from a channel used for a data communication between a host (not shown) and the ATM 210.

The shared key transmission apparatus 220 may transmit a random number request message to the ATM 210 via the transmission unit 224.

The ATM 210 may receive the random number request message via the reception unit 213 to generate a random number. Hereinafter, the random number generated at the ATM 210 will be referred to as RN_ATM.

The encryption unit 211 of the ATM 210 may encrypt RN_ATM to generate a first cryptogram. The transmission unit 212 may transmit the generated first cryptogram to the shared key transmission apparatus 220.

According to an embodiment of the present invention, the encryption unit 211 of the ATM 210 may encrypt RN_ATM using PK_RKTS to generate a first cryptogram.

Also, according to an embodiment of the present invention, the encryption unit 211 of the ATM 210 may encrypt RN_ATM using PK_RKTS according to a Rivest-Shamir-Adleman (RSA) algorithm to thereby generate a first cryptogram.

Here, the RSA algorithm denotes an encryption and authentication algorithm. The RSA algorithm may need an operation to induce two sets of number systems. One set may be used to construct a public key through a multiplication of two large prime numbers and an additional operation. Another set may be used to construct a secret key. The secret key may be used to decrypt a text that is encrypted using the public key.

The shared key transmission apparatus 220 may receive the first cryptogram from the ATM 210 via the reception unit 221. The decryption unit 222 may restore RN_ATM from the received first cryptogram. The restored RN_ATM may be used to encrypt the shared key and transmit the encrypted shared key to the ATM 210.

According to an embodiment of the present invention, when the first cryptogram is generated by encrypting RN_ATM using PK_RKTS, the decryption unit 222 may decrypt the first cryptogram using SK_RKTS to thereby restore RN_ATM.

Also, according to an embodiment of the present invention, when the first cryptogram is generated by encrypting RN_ATM using PK_RKTS according to the RSA algorithm, the decryption unit 222 may decrypt the first cryptogram using SK_RKTS according to the RSA algorithm to thereby restore RN_ATM.

Also, according to an embodiment of the present invention, the encryption unit 223 of the shared key transmission apparatus 220 may encrypt the restored RN_ATM using PK_ATM, and transmit the encrypted RN_ATM to the ATM 210 via the transmission unit 224. This is a process performed at the ATM 210 to authenticate the shared key transmission apparatus 220.

The ATM 210 may receive, via the reception unit 213, RN_ATM that is encrypted using PK_ATM. The decryption unit 214 may restore, using SK_ATM, RN_ATM from RN_ATM that is encrypted using PK_ATM. When it is determined the restored RN_ATM is the same as RN_ATM generated at the ATM 210, the ATM 210 may authenticate, as a right shared key transmission apparatus, the shared key transmission apparatus 220 that has transmitted the encrypted RN_ATM.

When the encryption unit 223 of the shared key transmission apparatus 220 encrypts the restored RN_ATM using PK_ATM according to the RSA algorithm, the decryption unit 214 of the ATM 210 may restore RN_ATM using SK_ATM according to the RSA algorithm.

When the ATM 210 authenticates the shared key transmission apparatus 220, the shared key transmission apparatus 220 may transmit the shared key to the ATM 210. For example, the ATM 210 may transmit a shared key request message to the shared key transmission apparatus 220. In response to the shared key request message, the shared key transmission apparatus 220 may transmit the shared key to the ATM 210.

The encryption unit 223 of the shared key transmission apparatus 220 may encrypt the shared key using the restored RN_ATM.

Specifically, the shared key transmission apparatus 220 may transmit, to the ATM 210, the shared key that is encrypted using RN_ATM generated at the ATM 210 to thereby protect the shared key from a third party attack such as a man in the middle attack.

According to an embodiment of the present invention, the shared key transmission apparatus 220 may include the shared key generation unit 225 to generate the shared key. In this case, the shared key generation unit 225 may generate the shared key by combining at least one partial shared key that is received from a shared key management system, for example, a key management system (KMS) (not shown).

Specifically, in the conventional art, two managers generally visit the ATM 210 in person and manually install and store two partial shared keys envelope1 and envelope2 in the ATM 210. However, according to an embodiment of the present invention, the shared key transmission apparatus 220 may receive two partial shared keys from the shared key management system and combine the received partial shared keys to thereby generate the shared key and then may transmit the generated shared key to the ATM 210 online. Through this, it is possible to reduce an unnecessary operation and a manpower consumption. The partial shared keys may be transmitted via a channel of which a security is guaranteed.

For example, the shared key management system may be provided in a bank where a host exists. In addition to the bank, the shared key management system may be managed in a reliable institution with a right to manipulate the shared key.

According to an embodiment of the present invention, the shared key generation unit 225 may receive at least one partial shared key from a manager of the shared key management system offline. In this case, the manager of the shared key management system may have no need to individually visit the ATM 210. Specifically, the manager of the shared key management system may visit only the shared key transmission apparatus 220 and input the partial shared key. Accordingly, it is possible to reduce an unnecessary manpower consumption. Also, since the shared key transmission apparatus 220 is managed at the reliable institution, it is possible to guarantee the security for transmission of the shared key.

The encrypted shared key may be transmitted to the ATM 210 via the transmission unit 224.

According to an embodiment of the present invention, the encryption unit 223 of the shared key transmission apparatus 220 may encrypt the shared key using the restored RN_ATM according to a Triple Data Encryption Standard (TDES) algorithm to thereby generate a second cryptogram. The transmission unit 224 of the shared key transmission apparatus 220 may transmit the second cryptogram to the ATM 210.

In this instance, the ATM 210 may receive the second cryptogram via the reception unit 213. The decryption unit 214 of the ATM 210 may decrypt the second cryptogram using the generated RN_ATM according to the TDES algorithm to thereby restore the shared key.

Also, according to an embodiment of the present invention, the encryption unit 223 of the shared key transmission apparatus 220 may encrypt the second cryptogram using PK_ATM according to the RSA algorithm to thereby generate a third cryptogram. The transmission unit 224 of the shared key transmission apparatus 220 may transmit the third cryptogram to the ATM 210.

In this case, the ATM 210 may receive the third cryptogram via the reception unit 213. The decryption unit 214 of the ATM 210 may decrypt the third cryptogram using SK_ATM according to the RSA algorithm to thereby restore the second cryptogram, and may decrypt the restored second cryptogram to thereby restore the shared key. In this instance, the process of restoring the shared key from the second cryptogram will be the same as the aforementioned description.

Also, according to an embodiment of the present invention, the encryption unit 223 of the shared key transmission apparatus 220 may encrypt the third cryptogram using SK_RKTS to thereby generate a fourth cryptogram. The transmission unit 224 of the shared key transmission apparatus 220 may transmit the third cryptogram and the fourth cryptogram to the ATM 210.

In this case, the ATM 210 may receive the third cryptogram and the fourth cryptogram via the reception unit 213. The decryption unit 214 of the ATM 210 may decrypt the fourth cryptogram using PK_RKTS to thereby restore the third cryptogram. When the restored third cryptogram is the same as the received third cryptogram, the ATM 210 may authenticate, as a right shared key transmission apparatus, the shared key transmission apparatus 220 that has transmitted the third cryptogram and the fourth cryptogram. The process of restoring the third cryptogram from the fourth cryptogram and the process of restoring the shared key from the second cryptogram will be the same as the aforementioned description.

After the shared key is restored, the control unit 215 of the ATM 210 may install the restored shared key in the ATM 210.

When the shared key is installed, the ATM 210 may transmit an install complete message to the shared key transmission apparatus 220. The shared key transmission apparatus 220 may transmit, to the shared key management system, ID of a partial shared key and ID_ATM of the ATM 210 where the shared key is installed.

As described above, to transmit the shared key to the ATM 210, the shared key transmission apparatus 220 may use PK_ATM, PK_RKTS, SK_ATM, and SK_RKTS and may also further use RN_ATM corresponding to a random number generated at the ATM 210. Through this, it is possible to guarantee the security for transmission of the shared key.

Figure 3:
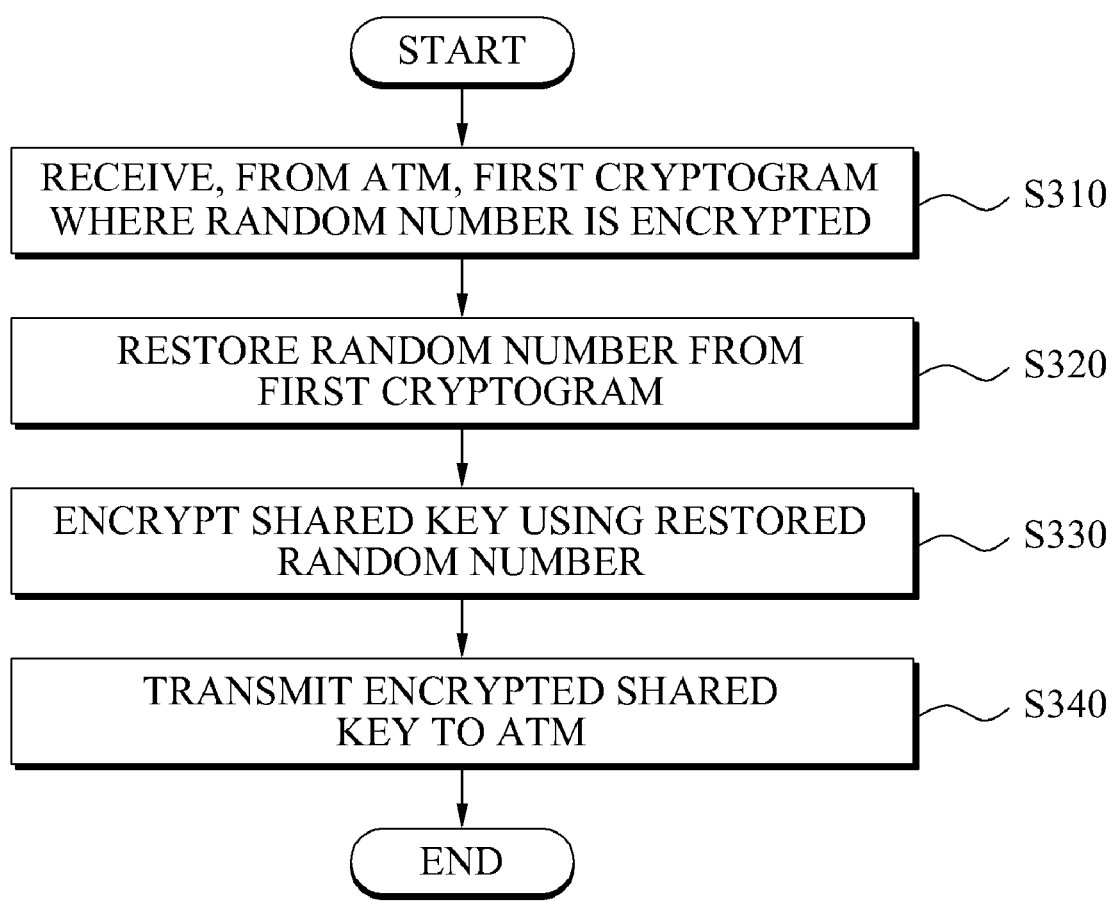
FIG. 3 is a flowchart illustrating a method of controlling a shared key transmission apparatus according to an embodiment of the present invention.

FIG. 3 is a flowchart illustrating a method of controlling a shared key transmission apparatus according to an embodiment of the present invention.

The controlling method of the shared key transmission apparatus may be processed at the shared key transmission apparatus 220 as shown in FIG. 2. Accordingly, although it is omitted in the following description, the description made above with reference to FIG. 2 may be applicable to the controlling method of the shared key transmission apparatus of FIG. 3.

In operation S310, a first cryptogram where a random number RN_ATM is encrypted may be received from an ATM.

In operation S320, the random number RN_ATM may be restored from the received first cryptogram.

In operation S330, a shared key may be encrypted using the restored random number RN_ATM.

In operation S340, the encrypted shared key may be transmitted to the ATM.

According to an embodiment of the present invention, the controlling method of the shared key transmission apparatus may further include generating a shared key. The generating of the shared key may include combining at least one partial shared key that is received from a shared key management system to thereby generate the shared key.

In this instance, according to an embodiment of the present invention, the generating of the shared key may include receiving at least one partial shared key offline from a manager of a shared key management system and combining the received at least one partial shared key to thereby generate the shared key.

Also, according to an embodiment of the present invention, when the first cryptogram where the random number RN_ATM is encrypted using the public key of the shared key transmission apparatus PK_RKTS is received in operation S310, the random number RN_ATM may be restored by decrypting the first cryptogram using a secret key of the shared key transmission apparatus SK_RKTS in operation S320.

Also, according to an embodiment of the present invention, when the first cryptogram where the random number RN_ATM is encrypted using a public key of the shared key transmission apparatus PK_RKTS according to an RSA algorithm is received in operation S310, the random number RN_ATM may be restored by decrypting the first cryptogram using the secret key of the shared key transmission apparatus SK_RKTS according to the RSA algorithm in operation S320.

Also, according to an embodiment of the present invention, a second cryptogram may be generated by encrypting the shared key using the restored random number RN_ATM according to a TDES algorithm in operation S330. In operation S340, the second cryptogram may be transmitted to the ATM.

Also, according to an embodiment of the present invention, a third cryptogram may be generated by encrypting the second cryptogram using a public key of the ATM PK_ATM according to the RSA algorithm in operation S330. In operation S340, the third cryptogram may be transmitted to the ATM.

Also, according to an embodiment of the present invention, a fourth cryptogram may be generated by encrypting the third cryptogram using the secret key of the shared key transmission apparatus SK_RKTS. In operation S340, the third cryptogram and the fourth cryptogram may be transmitted to the ATM.

Figure 4:
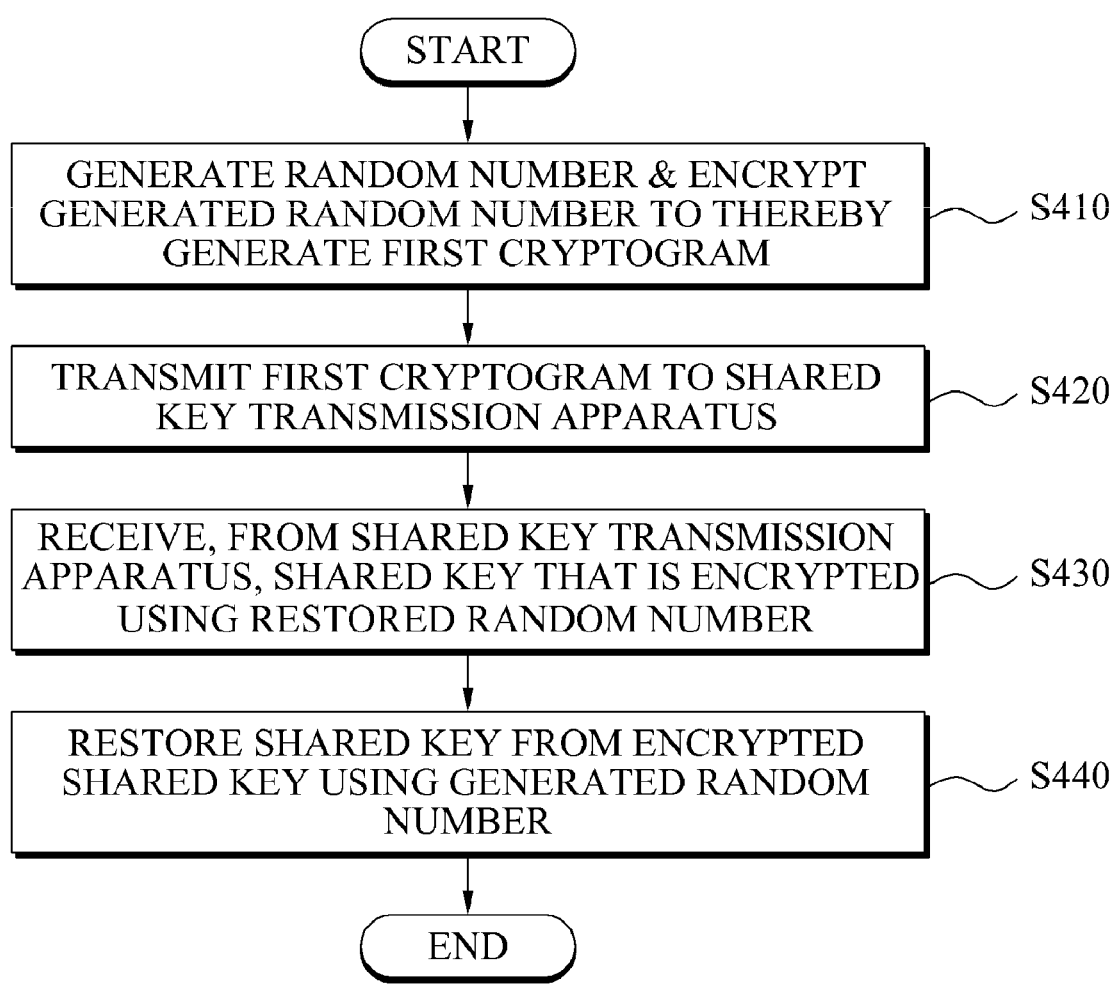
FIG. 4 is a flowchart illustrating a method of controlling an ATM according to an embodiment of the present invention.

FIG. 4 is a flowchart illustrating a method of controlling an ATM according to an embodiment of the present invention.

The controlling method of the ATM may be processed at the ATM 210 as shown in FIG. 2. Accordingly, although it is omitted in the following description, the description made above with reference to FIG. 2 may be applicable to the controlling method of the ATM of FIG. 4.

In operation S410, a random number RN_ATM may be generated and the generated random number RN_ATM may be encrypted to thereby generate a first cryptogram.

In operation S420, the first cryptogram may be transmitted to a shared key transmission apparatus.

In operation S430, a shared key that is encrypted using the random number RN_ATM restored from the first cryptogram may be received from the shared key transmission apparatus.

In operation S440, the shared key may be restored from the encrypted shared key using the generated random number RN_ATM.

According to an embodiment of the present invention, the first cryptogram may be generated by encrypting the generated random number RN_ATM using a public key of the shared key transmission apparatus PK_RKTS in operation S410.

Also, according to an embodiment of the present invention, the first cryptogram may be generated by encrypting the generated random number RN_ATM using the public key of the shared key transmission apparatus PK_RKTS according to an RSA algorithm in operation S410.

Also, according to an embodiment of the present invention, when a second cryptogram where the shared key is encrypted using the restored random number RN_ATM according to a TDES algorithm is received in operation S430, the shared key may be restored by decrypting the second cryptogram using the generated random number RN_ATM according to the TDES algorithm in operation S440.

Also, according to an embodiment of the present invention, when a third cryptogram where the second cryptogram is encrypted using a public key of the ATM PK_ATM according to an RSA algorithm is received in operation S430, the second cryptogram may be restored by decrypting the third cryptogram using a secret key of the ATM SK_ATM according to the RSA algorithm and the shared key may be restored by decrypting the restored second cryptogram in operation S440.

Also, according to an embodiment of the present invention, when a fourth cryptogram where the third cryptogram is encrypted using a secret key of the shared key transmission apparatus SK_RKTS in operation S430, the third cryptogram may be restored by decrypting the fourth cryptogram using a public key of the shared key transmission apparatus PK_RKTS, the second cryptogram may be restored by decrypting the third cryptogram, and the shared key may be restored by decrypting the second cryptogram in operation S440.

Figure 5:
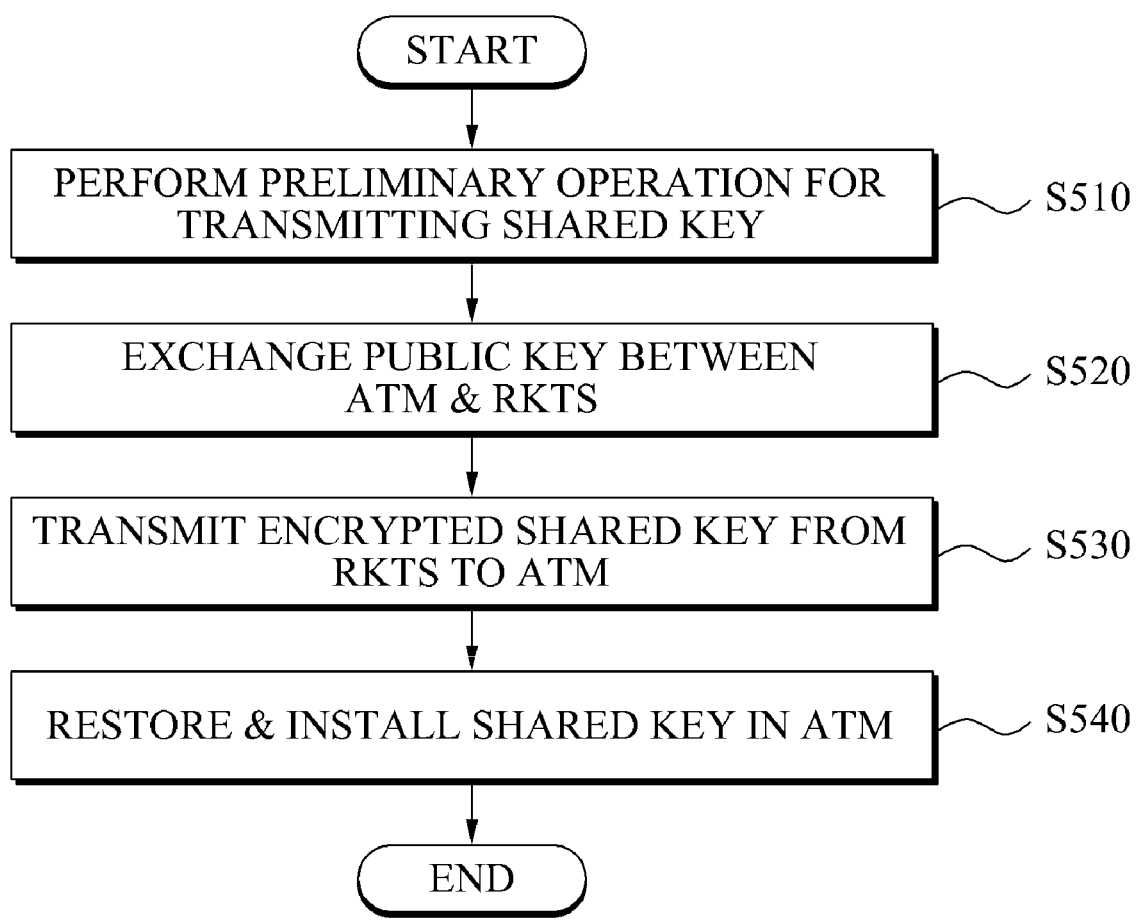
FIG. 5 is a flowchart illustrating a method of installing a shared key in an ATM according to an embodiment of the present invention.

FIGS. 5 through 7 are flowcharts illustrating a process of installing, in an ATM, a shared key that is used for a data communication between the ATM and a host according to an embodiment of the present invention.

As described above, transmission and reception of data may be performed independently from a channel used for the data communication between the host and the ATM.

FIG. 5 is a flowchart illustrating a method of installing a shared key in an ATM according to an embodiment of the present invention.

In operation S510, a preliminary operation for transmitting a shared key may be performed.

Specifically, the ATM may store a public key of the ATM (hereinafter, PK_ATM), a secret key of the ATM (hereinafter, SK_ATM), an identification number of the ATM (Hereinafter, ID_ATM), PK_ATM that is encrypted using a secret key of a certificate authority (hereinafter, Signed(SK_CA) [PK_ATM]), and ID_ATM that is encrypted using the secret key of the certificate authority (hereinafter, Signed SK_CA) [ID_ATM]. The shared key transmission apparatus (hereinafter, RKTS) may store a public key of the RKTS (hereinafter, PK_RKTS), a secret key of the RKTS (hereinafter, SK_RKTS), and PK_RKTS that is encrypted using a secret key of the certificate authority (hereinafter, Signed(SK_CA) [PK_RKTS].

In operation S520, the public key may be exchanged between the ATM and the RKTS. Specifically, in operation S520, a mutual authentication may be performed between the ATM and the RKTS.

Hereinafter, a public key exchange process will be described in detail with reference to FIG. 6.

FIG. 6 is a flowchart illustrating a public key exchange process, that is, a mutual authentication process between an ATM 610 and an RKTS 620 according to an embodiment of the present invention.

In operation S631, the RKTS 620 may request the ATM 610 for ID_ATM.

In operation S632, in response to the request for ID_ATM, the ATM 610 may transmit ID_ATM and Signed(SK_CA) [ID_ATM] to the RKTS 620.

In operation S633, the RKTS 620 may decrypt Signed (SK_CA)[ID_ATM] using a public key of the certificate authority (hereinafter, PK_CA) to thereby restore ID_ATM, and may determine whether the restored ID_ATM is the same as the transmitted ID_ATM.

Also, in operation S633, when it is determined the restored ID_ATM is the same as the transmitted ID_ATM, the RKTS 620 may determine the ATM 610 as a right ATM and store ID_ATM.

In operation S634, the RKTS 620 may transmit PK_RKTS and Signed(SK_CA)[PK_RKTS] to the ATM 610.

In operation S635, the ATM 610 receiving PK_RKTS and Signed(SK_CA)[PK_RKTS] may decrypt Signed(SK_CA) [PK_RKTS] using PK_CA to thereby restore PK_RKTS, and may determine whether the restored PK_RKTS is the same as the transmitted PK_RKTS.

Also, in operation S635, when it is determined the restored PK_RKTS is the same as the transmitted PK_RKTS, the ATM 610 may determine the RKTS 620 as a right RKTS and store PK_RKTS.

In operation S636, the ATM 610 may transmit PK_ATM and Signed(SK_CA)[PK_ATM] to the RKTS 620.

In operation S637, the RKTS 620 receiving PK_ATM and Signed(SK_CA)[PK_ATM] may decrypt Signed(SK_CA) [PK_ATM] using PK_CA to thereby restore PK_ATM. When the restored PK_ATM is the same as the transmitted PK_ATM, the ATM 610 may determine the ATM 610 as a right ATM and store PK_ATM.

Through the above process, the mutual authentication between the ATM 610 and the RKTS 620 may be completed.

A process of installing a shared key in an ATM according to an embodiment of the present invention will be described with reference again to FIG. 5.

In operation S530, the shared key may be transmitted from the RKTS to the ATM.

Hereinafter, a process of transmitting a shared key according to an embodiment of the present invention will be described in detail with reference to FIG. 7.

In operation S7301, an RKTS 720 may request an ATM 710 for RN_ATM.

In operation S7302, in response to the request for RN_ATM, the ATM 710 may generate RN_ATM and may encrypt RN_ATM using PK_RKTS according to an RSA algorithm to thereby generate RSACrypt(PK_RKTS) [RN_ATM].

In operation S7303, the ATM 710 may transmit RSACrypt (PK_RKTS)[RN_ATM] to the RKTS 720.

In operation S7304, the RKTS 720 receiving RSACrypt (PK_RKTS)[RN_ATM] may restore RN_ATM from RSACrypt(PK_RKTS)[RN_ATM] using SK_RKTS. In operation S7305, the RKTS 720 may encrypt RN_ATM using PK_ATM according to the RSA algorithm to thereby generate RSACrypt(PK_ATM)[RN_ATM].

In operation S7306, the RKTS 720 may transmit RSACrypt(PK_ATM)[RN_ATM] to the ATM 710.

In operation S7307, the ATM 710 receiving RSACrypt (PK_ATM)[RN_ATM] may decrypt RSACrypt(PK_ATM) [RN_ATM] using SK_ATM to thereby restore RN_ATM, and may determine whether the restored RN_ATM is the same as the generated RN_ATM.

Also, in operation S7307, when it is determined the restored RN_ATM is the same as the generated RN_ATM, the ATM 710 may determine the RKTS 720 as a right RKTS. In operation S7308, the ATM 710 may request the RKTS 720 for a shared key, for example, a TMK.

In operation S7309, the RKTS 720 may generate the TMK.

In operation S7310, the RKTS 720 may encrypt the TMK using RN_ATM according to a TDES algorithm to thereby generate TDESCrypt(RN_ATM)[TMK]. In operation S7311, the RKTS 720 may encrypt TDESCrypt(RN_ATM)[TMK] using PK_ATM according to the RSA algorithm to thereby generate RSACrypt(PK_ATM)[TDESCrypt(RN_ATM) [TMK]]. In operation S7312, the RKTS 720 may encrypt RSACrypt(PK_ATM)[TDESCrypt(RN_ATM)[TMK]] using SK_RKTS to thereby generate Signed(SK_RKTS) [RSACrypt(PK_ATM)[TDESCrypt(RN_ATM)[TMK]]].

In operation S7313, the RKTS 720 may transmit, to the ATM 710, RSACrypt(PK_ATM)[TDESCrypt(RN_ATM) [TMK]] and Signed(SK_RKTS)[RSACrypt(PK_ATM) [TDESCrypt(RN_ATM)[TMK]]].

In operation S7314, the ATM 710 may decrypt Signed (SK_RKTS)[RSACrypt(PK_ATM)[TDESCrypt(RN_ATM) [TMK]]] using PK_RKTS to thereby restore RSACrypt (PK_ATM)[TDESCrypt(RN_ATM)[TMK]]. When the restored RSACrypt(PK_ATM)[TDESCrypt(RN_ATM) [TMK]] is the same as the transmitted RSACrypt(PK_ATM) [TDESCrypt(RN_ATM)[TMK]], the ATM 710 may determine the RKTS 720 as a right RKTS.

A process of installing a shared key in an ATM according to an embodiment of the present invention will be described with reference again to FIG. 5.

In operation S540, the shared key may be stored and the restored ATM may be installed in the ATM.

According to an embodiment of the present invention, an ATM installed with a shared key may perform a check sum response of the installed shared key and may transmit a key sum value (KSV) to a shared key transmission apparatus, for example, a remote key transfer server (RKTS). The shared key transmission apparatus receiving the KSV may verify the KSV and inform a verification result to a shared key management system, for example, a key management system (KMS). The shared key management system may transfer the shared key to a host.

When all the procedures related to the shared key installation process are completed, the shared key input into the shared key transmission apparatus may be destroyed.

Embodiments of a method of controlling an ATM and a method of controlling a shared key transmission apparatus have been described above. A configuration of the ATM and the shared key transmission apparatus described above with reference to FIG. 2 may be applicable to the embodiments. Accordingly, further detailed description related thereto will be omitted here.

The ATM and the shared key transmission apparatus controlling method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

As described above, according to embodiments of the present invention, a shared key transmission apparatus and an ATM may perform a mutual authentication process. The authenticated shared key transmission apparatus and the ATM may transmit and receive data to transmit a shared key.

Also, according to embodiments of the present invention, when installing a shared key in an ATM, it is possible to reduce an unnecessary operation and manpower consumption.

Also, according to embodiments of the present invention, when securely installing a shared key in an ATM online, it is possible to enhance a security.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A shared key transmission apparatus comprising:
a reception unit configured to receive, from an automatic teller machine, a first cryptogram comprising an encrypted random number;
a decryption unit configured to restore the random number from the first cryptogram;
an encryption unit configured to:
generate a second cryptogram by encrypting a shared key using the restored random number;
generate a third cryptogram by encrypting the second cryptogram using a first public key; and
generate a fourth cryptogram by encrypting the third cryptogram using a first secret key; and
a transmission unit configured to transmit the third cryptogram and the fourth cryptogram to the automatic teller machine, the automatic teller machine decrypting the third cryptogram using a second secret key and decrypting the fourth cryptogram using a second public key, the automatic teller machine comparing the decrypted fourth cryptogram with the third cryptogram to authenticate the shared key transmission apparatus.

2. The shared key transmission apparatus of claim 1, further comprising:
a shared key generation unit to generate the shared key,
wherein the shared key generation unit generates the shared key by combining at least one partial shared key that is received from a shared key management system.

3. The shared key transmission apparatus of claim 1, further comprising:
a shared key generation unit to generate the shared key,
wherein the shared key generation unit generates the shared key by combining at least one partial shared key that is received offline from a manager of a shared key management system.

4. The shared key transmission apparatus of claim 1, wherein the random number is encrypted at the automatic teller machine using a third public key, the decryption unit decrypts the first cryptogram using a third secret key to restore the random number.

5. The shared key transmission apparatus of claim 1, wherein the random number is encrypted using a third public key according to a Rivest-Shamir-Adleman (RSA) algorithm, the decryption unit decrypts the first cryptogram using a third secret key according to the RSA algorithm to restore the random number.

6. The shared key transmission apparatus of claim 1, wherein:
the encryption unit encrypts the shared key using the restored random number according to a Triple Data Encryption Standard (TDES) algorithm to generate the second cryptogram.

7. The shared key transmission apparatus of claim 6, wherein:
the encryption unit encrypts the second cryptogram using an RSA algorithm to generate the third cryptogram.

8. An automatic teller machine for performing a data communication with a host, to receive a shared key from a shared key transmission apparatus via online communication, the automatic teller machine comprising:
an encryption unit configured to generate a random number and to encrypt the random number into a first cryptogram;
a transmission unit configured to transmit the first cryptogram to the shared key transmission apparatus;
a reception unit configured to receive, from the shared key transmission apparatus, a third cryptogram and a fourth cryptogram, wherein a second cryptogram is generated at the shared key transmission apparatus by encrypting the shared key using the random number, wherein the third cryptogram is generated at the shared key transmission apparatus by encrypting the second cryptogram using a first public key, wherein the fourth cryptogram is generated at the shared key transmission apparatus by encrypting the third cryptogram using a first secret key; and
a decryption unit configured to decrypt the third cryptogram using a second secret key to restore the second cryptogram, restore the shared key from the second cryptogram using the generated random number, and decrypt the fourth cryptogram using a second public key for comparison with the third cryptogram to authenticate the shared key transmission apparatus.

9. The automatic teller machine of claim 8, wherein the encryption unit encrypts the generated random number using a third public key of the shared key transmission apparatus to generate the first cryptogram.

10. The automatic teller machine of claim 8, wherein the encryption unit encrypts the generated random number using a third public key of the shared key transmission apparatus according to an RSA algorithm to generate the first cryptogram.

11. The automatic teller machine of claim 8, wherein, the decryption unit decrypts the second cryptogram using the generated random number according to a TDES algorithm to restore the shared key.

12. The automatic teller machine of claim 11, wherein the decryption unit decrypts the third cryptogram using the second secret key of the automatic teller machine according to a RSA algorithm to restore the second cryptogram, and decrypts the restored second cryptogram to restore the shared key.

13. The automatic teller machine of claim 12, wherein the decryption unit decrypts the third cryptogram to restore the second cryptogram, and decrypts the second cryptogram to restore the shared key.

14. An automated teller system comprising:
a shared key transmission apparatus to receive a shared key from a shared key management system, the shared key transmission apparatus configured to:
decrypt a first cryptogram to obtain a random number;
generate a second cryptogram by encrypting the shared key using the random number;
generate a third cryptogram by encrypting the second cryptogram using a first public key; and
generate a fourth cryptogram by encrypting the third cryptogram using a first secret key; and
an automatic teller machine configured to:
send the first cryptogram to the shared key transmission apparatus;
decrypt the second cryptogram using the random number to restore the shared key;
decrypt the fourth cryptogram using a second public key to obtain a third cryptogram;
compare the decrypted fourth cryptogram with the third cryptogram to authenticate the shared key transmission apparatus.

15. A method of controlling an automatic teller machine to perform a data communication with a host, to receive a shared key a shared key transmission apparatus via online communication, the method comprising:
generating a random number and encrypting the random number to generate a first cryptogram;
transmitting the first cryptogram to the shared key transmission apparatus;
receiving a third cryptogram generated by encrypting a second cryptogram using a first public key and a fourth cryptogram generated by encrypting the third cryptogram using a first secret key, wherein the second cryptogram was encrypted using the random number at the shared key transmission apparatus;
restoring the shared key from the second cryptogram using the generated random number
decrypting the fourth cryptogram using a second public key; and
comparing the decrypted fourth cryptogram with the third cryptogram to authenticate the shared key transmission apparatus.

* * * * *